June 2, 1953
C. E. SCHEURING
2,640,717
SEPARABLE PRESSURE VESSEL QUICK CLAMP
Filed July 26, 1949
3 Sheets-Sheet 1
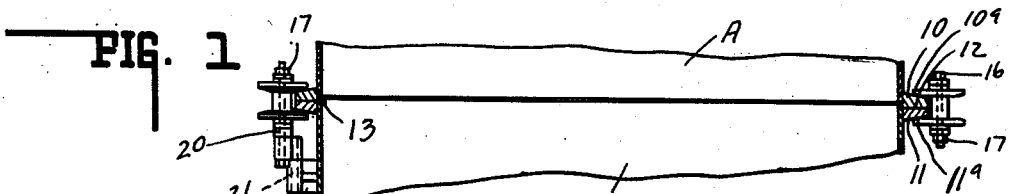
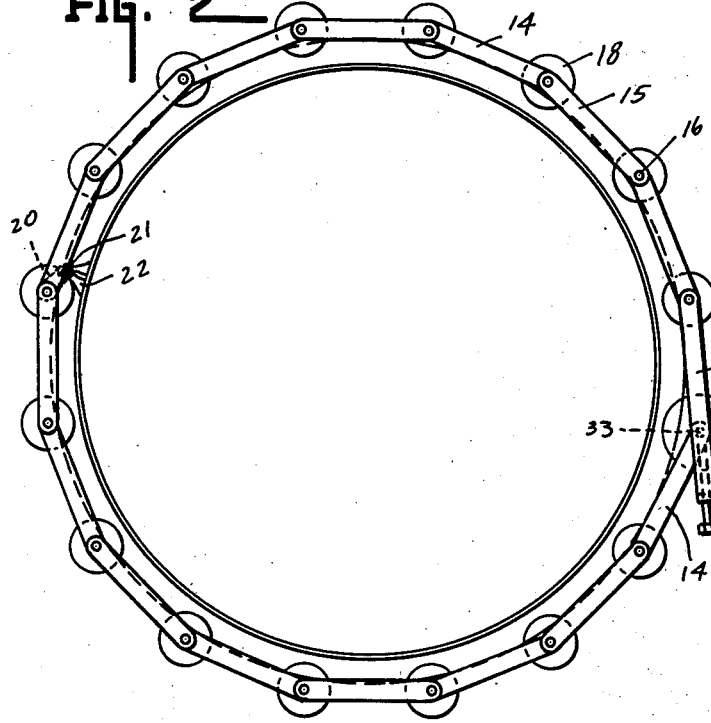
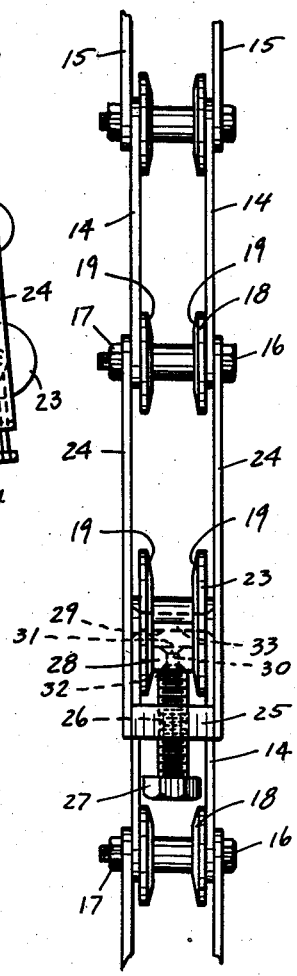
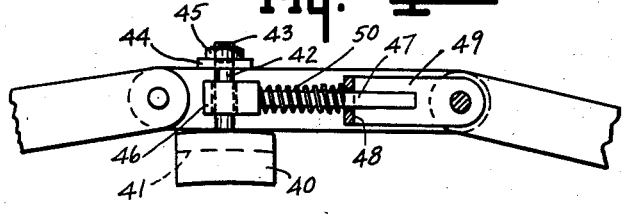
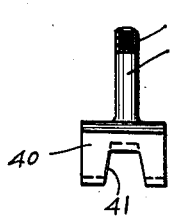
INVENTOR.
CHARLES E. SCHEURING.
BY
Lockwood, Goldsmith & Galt.
ATTORNEYS.

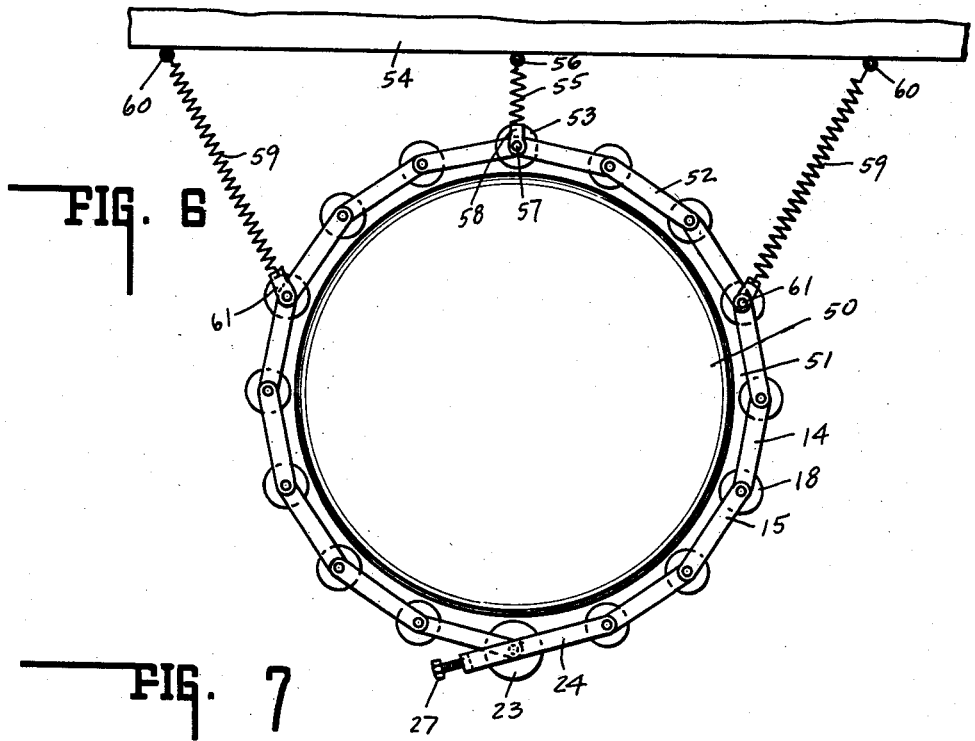
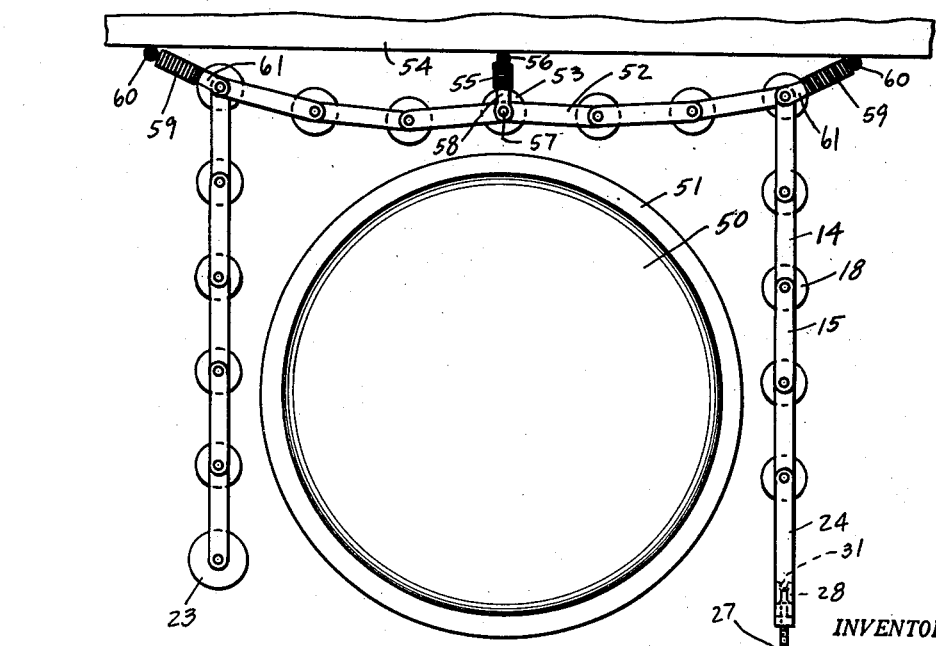

June 2, 1953 C. E. SCHEURING 2,640,717
SEPARABLE PRESSURE VESSEL QUICK CLAMP
Filed July 26, 1949 3 Sheets-Sheet 3
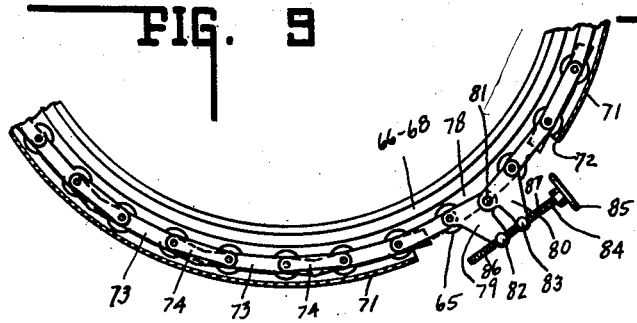
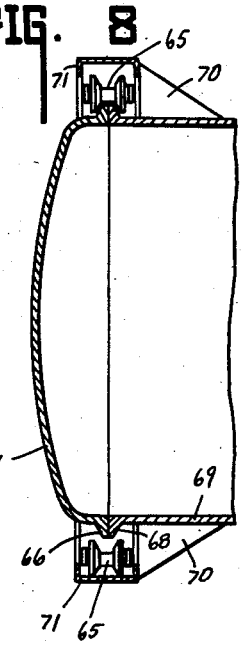
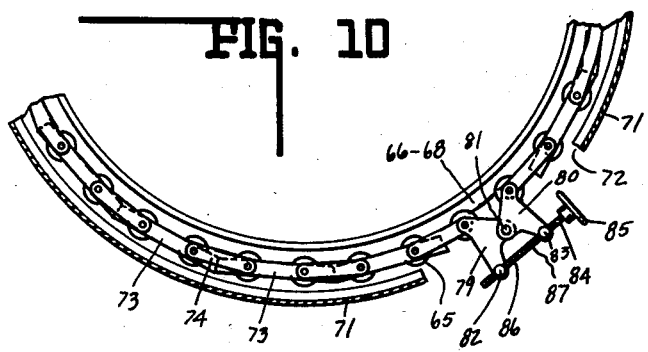
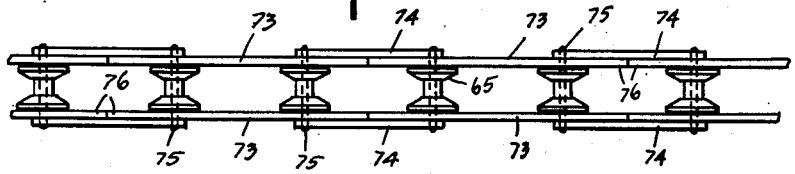
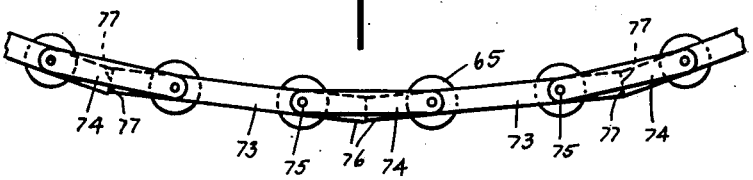
INVENTOR.
CHARLES E. SCHEURING.
BY
Lockwood, Goldsmith & Galt
ATTORNEYS.

Patented June 2, 1953

2,640,717

UNITED STATES PATENT OFFICE 2,640,717

SEPARABLE PRESSURE VESSEL QUICK CLAMP

Charles E. Scheuring, Indianapolis, Ind., assignor to Emerson-Scheuring Tank and Manufacturing Company, Inc., Indianapolis, Ind., a corporation Application July 26, 1949, Serial No. 106,899

3 Claims. (Cl. 285—129)

This invention relates to a closure assembly for sealed containers or pipe line joint connections.

The chief object of the present invention is to provide a closure assembly for two associated portions of a sealed container or a pipe line, which assembly is capable of holding high pressures and when of container form the contents can be quickly supplied thereto and as quickly removed therefrom.

The chief feature of the present invention resides in providing flanges upon adjacent ends of container or pipe line portions which flanges are opposed and one or both are tapered or inclined and then enveloping the flanges by an articulated, peripherally enveloping linkage carrying in spaced relation grooved clamp members in the form of blocks or rollers, the grooves seating the flanges, and the linkage being peripherally tautenable for simultaneously bringing the grooved elements toward the container or pipe line and the flanges together in sealed relation.

A second feature of the invention resides in disposing one flange structure so that it serves as a seat for the container or pipe line portion confronting it.

Other objects and features will be set forth more fully hereinafter.

The full nature of the invention will be understood from the accompanying drawings and the following description and claims.

In the drawings Fig. 1 is a vertical sectional view through a container and the joint portion thereof, one embodiment of the invention being shown applied thereto.

Fig. 2 is a top plan view of a container and said closure assembly.

Fig. 3 is an enlarged elevation of the tautening section of said invention.

Fig. 4 is a plan view of a modified form of the invention.

Fig. 5 is an elevational view of the block member thereof.

Fig. 6 is an end elevation of a horizontally disposed separable pressure container with the invention applied thereto and with which is associated a counter balancing support, the invention being illustrated in closed position.

Fig. 7 is a similar view of the same parts with the invention in open position.

Fig. 8 is a vertical sectional view of a horizontally disposed container wherein the tautening and clamping device is of "stiff chain" type whereby the control member thereof is adapted for opening and closing the device.

Fig. 9 is a side elevation of a modified operative section of the device in the open or extended position.

Fig. 10 is a similar view of the same parts in closed or clamping position.

Fig. 11 is a side elevation of a portion of the linkage.

Fig. 12 is a plan view thereof.

In Fig. 1, A indicates a tubular end portion of a container and B indicates the confronting end portion of that container. These two ends abut each other. Each has secured to it a collar. 10 indicates the collar on end A and 11 the collar upon end B. Each has its confronting face suitably formed and therebetween may be disposed gasket 12.

Each collar has its remote face biased or tapered as indicated at $10^a$ and $11^a$, respectively. Herein also collar 10 is disposed in overlapping relation to portion A, so that the end portion 13 of part B, which projects beyond collar 11, can seat in collar 10 as shown.

Thus when the upper part A with all of its appendages is set down upon lower part B and end 13 is telescoped into collar 10, the container parts are aligned and then may be securely clamped together in leak-proof relation and the clamp can resist high pressures such as 1000 p. s. i.

The articulated linkage comprises a succession of spaced clamping elements pivotally supported and connected by links, each clamping element having a truncated V-groove therein. The linkage also includes a tautening device. It may also include a pivotal connection to the container.

Specifically there are provided successive pairs of links which lap at the ends, to wit, inner links 14 and outer links 15. A bolt 16 and nut 17 connect the adjacent ends together with the centrally apertured spool 18 therebetween as shown. Said bolt and nut may be replaced by a double-headed rivet or pin.

Each spool pivots on this spindle, as it were. Each spool has its opposed flanges tapered inwardly on its adjacent sides as at 19. The throat of the spool groove is sufficiently wide to readily receive both container mounted flanges with included gasket, if utilized. The root of the spool is effectively less than that required to fully compress the flanges together even if the gasket be omitted. In practice the taper is not continued to the root of the groove.

One pivot is extended axially and pivotally mounts strap 20 below the other link and the spool. This strap in turn is pivoted at 21 on bracket 22 secured to the exterior of container part B. Note when the clamp is released and separated and the parts thereof turned back at this point the link 20 swings radially to dispose the adjacent spool 18 in the clear relative to the flanges so container separation can be effected and without loss or displacement of the clamping linkage. As stated, this connection is optional but is preferred.

One end of the articulated linkage terminates in a closing grooved member. In the present form this again is a spool 23 identical to the spools 18 but larger in diameter and it is supported by a pair of inner links 14 on rivet 33.

The other end of the articulated linkage terminates in a pair of outer links 24 joined at the free ends by cross-bar 25 which is bored and threaded as at 26 longitudinally of the same. Threaded therein is pressure bolt 27.

A pressure block 28 is grooved at 29 to bear upon the sleeve portion of spool 23. This pressure block is drilled and countersunk at 30 to take headed smaller screw bolt 31 that is threaded into the end of bolt 27 at 32. Thus the block may stand still while the bolt 27 is rotated.

Since no part of rivet 33 extends axially beyond the supporting links, the links 24 freely pass over the same in straddling relation providing block 28 is sufficiently retracted to clear the sleeve portion of spool 23.

To effect clamp sealing the two ends of the articulated linkage, after the container parts are abutted, are brought around said parts and towards each other. In so doing the pivotal support now disposes the closest spool in contact with both flanges. Of course, successive spools likewise contact both flanges until, as previously stated, the pressure device straddles the larger spool.

The reason this spool is larger is to have the tightening screw clear of the linkage where a wrench would be applied. After linkage closing, the bolt 27 is threaded into cross-bar 25 thus causing block 28 to engage the larger spool sleeve portion and thereby force that spool around toward the smaller end spool and draw the latter toward the larger spool. Note that the push on spool 28 exerts a pull on link 20 to bring in the chain.

It has been found that a spool every 22½ degrees is sufficient although a greater or lesser number may be utilized. Thus a chain to embrace and clamp flanges having approximately 38" O. D., having sixteen spools, the smaller being about 3" O. D. and the larger 4½" O. D. has been found satisfactory where the S. W. P. is 5#.

Now as the chain or linkage is tautened, the spools move inward radially and if necessary rotate or slide circumferentially on the opposed inclined faces of the flanges, thus drawing them closer together. In the example previously given a flange of about 1½" radial width with a 7½ degree taper has been found satisfactory. The spools obviously have the same taper. The tapers may be varied as desired.

Thus circumferential closing effects axial closing. Such closing and opening can be quickly effected and solely by the manipulation of but one bolt.

In the form of the invention illustrated in Figs. 4 and 5 there is illustrated a modified form of the invention which utilizes block segment elements which are provided with grooved faces for flange embracement. When flange-block slippage is not critical the link pivot pin, rivet or bolt passes through one end of the block and the other and flange confronting end is grooved.

However, since flange slippage is not desired and in no case should the block rotate, the several grooved elements are disposed as shown. Herein each block 40, which is a segment of a ring, is grooved as at 41 and mounts an outwardly directed radial tail 42 threaded at 43 to take link straddle plate 44 and nut 45.

Between the links is a slidable block 46 through which the tail 42 extends as shown. Block 46 has stem 47 that is slidable in plate 48 carried by member 49. A coil spring 50 bearing at opposite ends upon block 46 and plate 48 and concentric with stem 47 normally constrains the grooved block to one end of each pair of links directly mounting the blocks.

As the linkage is tightened, as previously described, the chain or linkage will creep relative to the blocks as they effect clamping, thereby eliminating creepage between groove blocks and flanges in the final clamping action.

When necessary to insure such creepage, anti-friction rollers may be interposed between the blocks and the chain links. These normally would be disposed cross-wise of the stem including links and be carried by the roller and at opposite ends bear upon the side edges of said links.

In Figs. 6 and 7 there is illustrated a horizontally disposed separable pressure container 50 having the peripheral flange 51. For illustration purposes the clamp is shown as of the first (roller) type and comprises links 52 and rollers 53. Disposed above the container joint is an overhead support 54.

A coil spring 55 is disposed centrally as shown and secured at one end to said support at 56 and at the other end to the roller supporting pin 57 by a clevis 58. At each side thereof is a second spring 59 secured at 60 to said support 54 and similarly secured to the adjacent roller at 61.

Fig. 7 shows the chain clamp aforesaid spring supported prior to application to the container. Fig. 6 shows the chain in clamping position.

Whenever desired or required fluid pressure cylinder and piston structures may be substituted in lieu of said springs. Whatever counterbalance system is used, the force of same is sufficient to sustain chain weight as shown in Fig. 7, but such force is readily overcome when the chain is clamped closed. Thus the chain weight is effectively eliminated as it were from the clamping force when the chain is used upon a horizontal pressure vessel.

Whenever desired or required one of the flanges need not have its remote face biased. In this event the grooved clamping member would only have one of the groove faces biased. In such modifications the crushing pressure on the biased faces must not exceed the metal capacity and if in excess or close approximation thereto the opposed faces are biased.

Reference will now be had to a modified form of the invention. This is termed the "stiff" chain or "stiff back" type. Herein the chain or articulated rigid link structure is positively opened and closed or expanded and contracted respectively by a single manually operable member.

In Figs. 8 to 12, 65 indicates the grooved spools, 66 the flange on part 67 and 68 the flange on part 69. Herein 67 indicates the cover or end of a horizontally disposed tank 69. Brackets 70 upon said container support in radially spaced relation with respect to flange 68 a C or channel sectioned ring 71 having an elongated opening 72 therein.

Disposed in said ring is the articulated rigid link structure comprising grooved rollers 65, long and short links 73 and 74 respectively, and roller pintles 75. The long links are in effect short links with opposite extensions 76. The confronting ends 77 are suitably biased so that they engage each other as the chain is opened.

Since the channel ring limits expansion of the lower half of the chain and it becomes of stiff back character as it is opened, the opening force causes the several links to move outwardly from the flanges and further into the C-ring retainer until the cover and its flange is free of the chain whereupon it may be quickly removed and replaced when desired in an equally easy manner. During this separation interval the open or extended chain is trapped in the root of the C-ring.

As shown in Figs. 9 and 10, the chain is open at 78. A pair of end structures 79 and 80 are pivotally connected to the respective end pintles and to each other at 81. They are in effect opposed bell cranks. The outer ends project through C-ring slot 72 and each terminates in a threaded bearing 82 and 83 respectively of opposite thread type.

A member 84 carrying hand wheel 85 at one end includes reversely threaded portions 86 and 87. When the hand wheel is turned in one direction the end pintles are separated and the chain is opened; when turned oppositely the end pintles are brought together and the chain is tightened.

While the invention has been illustrated and described in great detail in the drawings and foregoing description, the same is to be considered as illustrative and not restrictive in character.

The several modifications described herein as well as others which will readily suggest themselves to persons skilled in this art, all are considered to be within the broad scope of the invention, reference being had to the appended claims.

The invention claimed is:

1. In a container having operatively abutting ends and external substantially peripherally encircling flange means on the ends and juxtapositioned to each other, one flange means having a side face inclined away from the opposite side face and from the periphery towards the base of the flange means, the combination therewith of an articulated flange means enveloping linkage comprising links and pin means connecting the links together, a plurality of spaced grooved spools carried by said linkage and engageable with the flange means faces, certain of said spools being rotatably supported by said pin means, and tautening means at one end of the linkage for tightening said linkage about said flange means and drawing said spools inwardly upon said flange means faces for operatively clamping said flange means together.

2. Structure as defined by claim 1 wherein each of said flange means have side faces inclined away from the other from the periphery towards the base of said respective flange means, and wherein said spools have opposed flanges tapered inwardly complementary to the inclination of the side faces of said flange means.

3. Structure as defined by claim 1 wherein the linkage is connected to one of said container ends adjacent the joint therebetween.

CHARLES E. SCHEURING.

References Cited in the file of this patent

UNITED STATES PATENTS

| Number | Name | Date |
|---|---|---|
| 1,290,590 | Lehew | Jan. 7, 1919 |
| 2,178,819 | Timm | Nov. 7, 1939 |

FOREIGN PATENTS

| Number | Country | Date |
|---|---|---|
| 14,441 | Great Britain | Oct. 12, 1915 |
| 402,490 | Great Britain | Dec. 7, 1933 |